March 31, 1970     W. E. GLENN, JR     3,504,059
METHOD AND APPARATUS FOR MAKING THREE DIMENSIONAL PICTURES
Filed Oct. 12, 1965     3 Sheets-Sheet 1
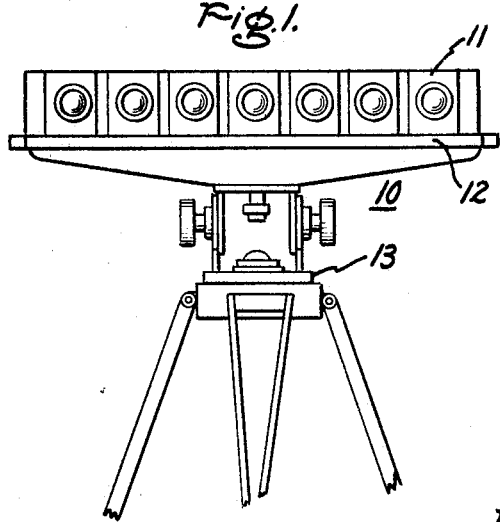
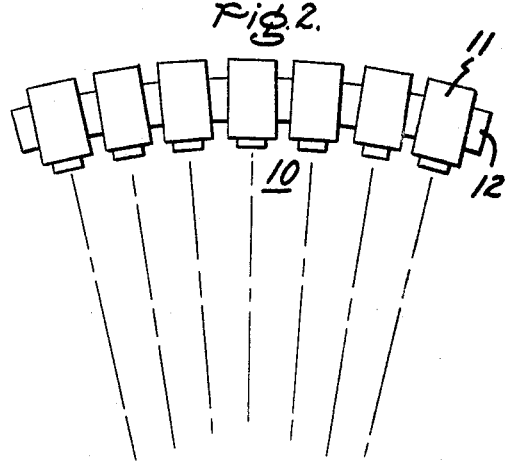
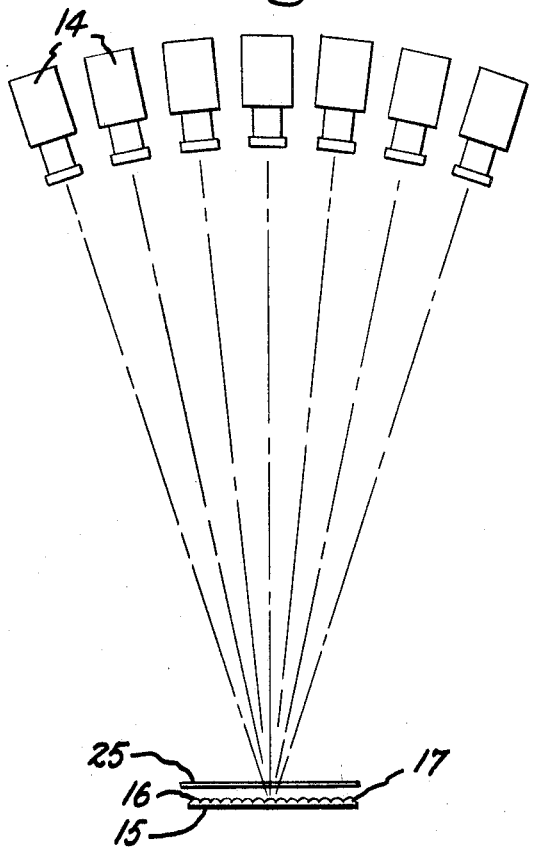
Inventor:
William E. Glenn Jr.,
by Richard R. Brainard
His Attorney.

March 31, 1970     W. E. GLENN, JR     3,504,059
METHOD AND APPARATUS FOR MAKING THREE DIMENSIONAL PICTURES
Filed Oct. 12, 1965     3 Sheets-Sheet 2
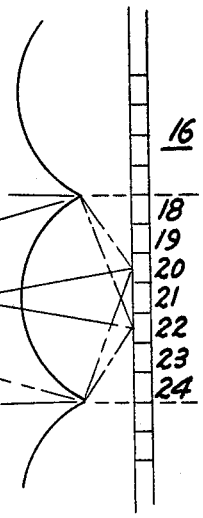
Fig. 4.
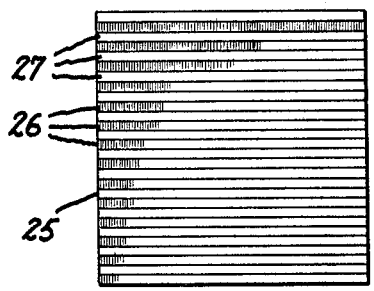
Fig. 5.
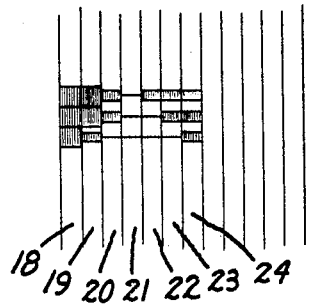
Fig. 6.
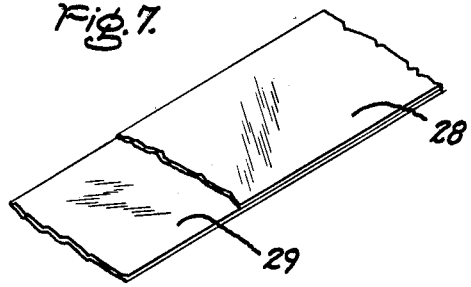
Fig. 7.
Inventor:
William E. Glenn Jr.,
by Richard R. Brainard
His Attorney.

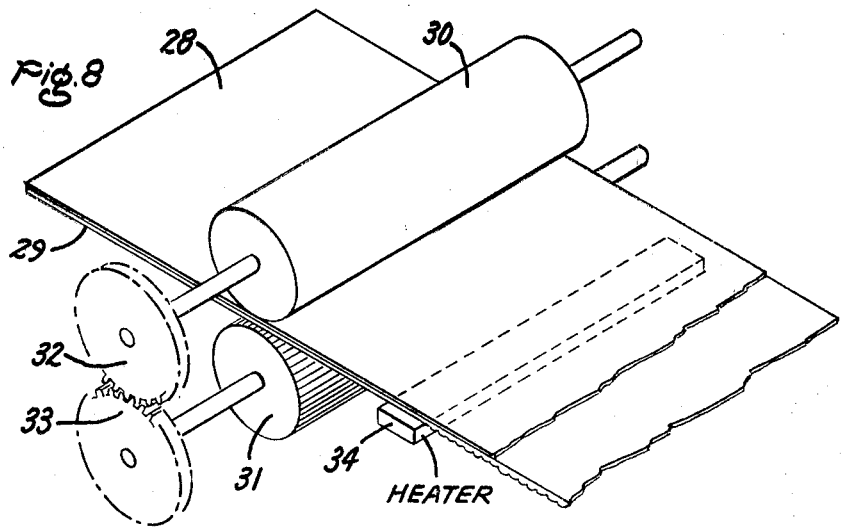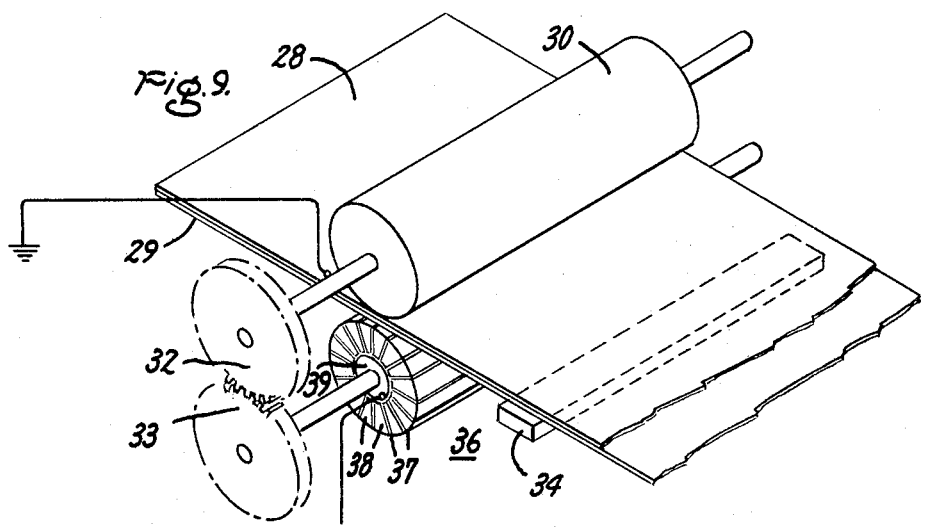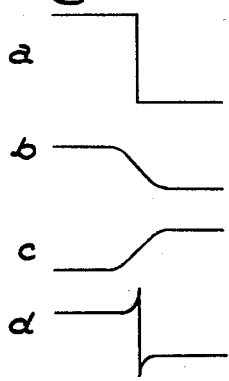

United States Patent Office 3,504,059
Patented Mar. 31, 1970

3,504,059
METHOD AND APPARATUS FOR MAKING THREE DIMENSIONAL PICTURES
William E. Glenn, Jr., Scotia, N.Y., assignor to General Electric Company, a corporation of New York
Filed Oct. 12, 1965, Ser. No. 495,276
Int. Cl. B29d *11/00;* G02b *17/06;* G03c *9/00*
U.S. Cl. 264—1
4 Claims

ABSTRACT OF THE DISCLOSURE

The present invention relates to an improved method and apparatus for making three dimensional lenticular pictures and particularly color pictures of this type.

---

There is an increasing interest in making good quality three dimensional pictures, particularly in color, and some pictures of this type have recently appeared in national magazines. In one form these pictures are made up of a plurality of sets of strip-like picture elements with each set viewed through one lenticule of a lenticule screen overlying the print. The apparent quality of the print as seen by the viewer is determined to a considerable degree by the accuracy of registration of the lenticules of the screen with the sets of picture elements with which they are associated. In accordance with present methods of making such pictures registration of the screen and picture is poor, and the resultant quality of the picture as seen by a viewer has also been poor. It is accordingly an important object of the present invention to provide an improved method of making three dimensional lenticular pictures which insures proper registration between the printed picture and the lenticules through which it is viewed.

Since many color pictures are printed by a plurality of separate printing steps corresponding to the different color components and to a black and white picture, it is apparent that many of the features of the present invention are equally applicable to color and black and white pictures.

One method of taking three dimensional pictures and reproducing them is described in an article by Leslie P. Dudley entitled "Autostereoscopic Lunar Photography", appearing in the October 1961 Journal of the Society of Motion Picture and Television Engineers 70, pages 799–803. As there described, particularly on page 800 under the heading "The Panoramic Parallax Stereogram", a black and white picture is taken by a number of cameras in closely spaced, side-by-side relation on an arc so that a number of pictures of the same scene are taken from a plurality of vantage points spaced along the arc, the number corresponding to the number of picture elements in each group of the lenticular picture to be produced. A set of picture elements is made up of interdigitated picture elements, one element from the film of each of the cameras, so that each set of picture elements appearing under one lenticule of the viewing screen represents an elemental portion of the total scene as viewed by each one of the cameras, and adjacent ones of these picture elements in a single set form a stereoscopic pair. Whether or not the stereoscopic pairs of elements are adjacent or spaced by two or more picture elements depends upon the spacing of the cameras as compared to the interocular distance. In accordance with an important aspect of a preferred embodiment of the present invention, the picture to be viewed, which may be printed in accordance with the picture information of the composite just described, is formed simultaneously on one surface of sheet material while the pattern of lenticules providing the viewing screen is formed simultaneously with the printing of the picture on the opposite side of the material.

In accordance with another feature of the invention, the composite picture is produced by projecting the scenes taken by the various cameras through what is essentially a halftone screen ruled in a horizontal direction, i.e. in a direction orthogonal to the direction of the picture elements of the interdigitated lenticular image.

In accordance with the preferred embodiments of my invention described in detail in relation to the drawings in the following specification, I show my invention applied to both black and white and color three dimensional picture printing in which the printing of the interdigitated picture elements and the formation of the viewing lenticular screen are accomplished simultaneously, or at least made on the same printing machine, so that improved registration of the printed picture and the viewing lenticular screen is obtained. As will be pointed out in detail in the application to color pictures, the lenticular viewing screen may be formed simultaneously with the printing of the luminosity information of the picture, i.e., the black and white aspect of the color picture, which is printed as a separate step in the color printing process. Further objects and advantages will become more apparent as the following description proceeds, reference being had to the accompanying drawings, and its scope will be pointed out in the appended claims.

In the drawings:
FIG. 1 is an elevational view showing in outline a camera arrangement suitable for taking three dimensional pictures;
FIG. 2 is a plan view in outline of the camera arrangement of FIG. 1;
FIG. 3 is a schematic representation of a projection and enlarging system suitable for producing an interdigitated three dimensional picture on a screen or on a high resolution film suitable for the preparation of a printing plate;
FIG. 4 is an enlarged view showing the manner in which the lenticule serves to focus light from one picture element from each set on the left eye of an observer and light from another picture element on the right eye of an observer to produce the stereoscopic effect;
FIG. 5 is a schematic representation of a halftone plate suitable for use in the apparatus of FIG. 3;
FIG. 6 is a schematic representation showing the printed halftone lenticular image resulting from the apparatus of FIG. 1 showing the gray scale rendition in the vertical direction along the length of the interdigitated picture elements;
FIG. 7 is an isometric view showing the two layer material suitable for the production of the printed picture and lenticular plate making up the improved three dimensional picture of the present invention;
FIG. 8 is a schematic representation of a printing press for producing a stereoscopic picture and overlying lenticular plate in accordance with the present invention;
FIG. 9 is a schematic representation of a modification of the apparatus of FIG. 8 showing a different means for producing the lenticular plate; and
FIG. 10 illustrates the steps involved in producing a luminance film having eccentuated luminance information at the color edges.

A suitable multiple camera arrangement for taking pictures to be reproduced in accordance with the present invention is shown in FIGS. 1 and 2 of the drawing. The camera assembly 10 is made up of a number of individual cameras shown in outline at 11, all mounted on a support 12 in the same horizontal plane and preferably on the arc of a circle, as shown in FIG. 2. The assembly is preferably mounted on an adjustable support such as a tripod 13.

The cameras are compact and are particularly so in a horizontal direction so that several cameras occupy a horizontal distance equal to the spacing between the eyes of an individual who is to view the image. For example, the center-to-center spacing of the cameras may be approximately one and one-half inches. The number of cameras which corresponds to the number of picture elements that will appear under each lenticule may be in the order of seven to ten, for example, seven having been illustrated in FIG. 1. In taking the picture, the film in each camera is simply exposed so that there are seven pictures taken from the seven vantage points corresponding to the locations of the individual cameras.

In FIG. 3 there is shown schematically an arrangement for projecting an enlarged picture made up of individual picture elements from the seven cameras. This apparatus and method of enlarging and composing three-dimensional pictures of the interdigitated type is more fully described and broadly claimed in my continuation-in-part application Ser. No. 631,772, filed Apr. 18, 1967. As illustrated, the system includes seven projectors, shown in outline at 14, all carried by a common support and subtending at an angle equal to the permissible viewing angle of an observer. The images are projected on an image area 15, which may be a screen, or, as in the preferred embodiment illustrated, a strip of high resolution black and white film such as sold on the market under the trade name "Kodalith," which may be developed and used for the preparation of a printing plate or printing roll in accordance with well known processes. Supported in front of the film in closely spaced relation thereto is a thin lenticule plate 16 made up of a large number of vertically extending lens elements 17 each in the shape of a cylindrical segment. These may be formed in many ways well known in the art and may, for example, be formed in a thermoplastic material. The optics of the system are such that each lenticule focuses a portion of the lens of each projector on the film 15 in adjacent strips so that an image of a small area of the scene as viewed by each camera is printed in adjacent relation under each lenticule. The portion of the scene which is printed progresses from one side of the scene to the other as one progresses from one side edge of the film 15 to the other, so that picture elements taken from each of the vantage points form a set under each lenticule, and these sets, under the total number of lenticules covering the scene area, depict the entire picture in stereographic form. While it is possible that the adjacent picture elements will form a stereoscopic pair, in accordance with the preferred arrangement of my invention the cameras are more closely spaced than the ocular spacing of an observer, so that every third element forms one element of a stereoscopic pair.

The enlarged view shown in FIG. 4 illustrates the manner in which light emanating from the picture elements 18–24, inclusive, is imaged on the eyes of an observer. As illustrated, light from picture element 20 is shown focused on the right eye of the observer, and light from element 22 is imaged on the left eye of the observer. The permissible range of viewing as far as the position of the observer is concerned covers that lateral displacement which is permitted without viewing light emanating from an element corresponding to a left-eyed element with the right eye. This means that the observer has a freedom of movement which is determined by the number of picture elements and the focal length of the lenses of the lenticular plate.

The lenticular plate 16 may include lenses 17 which are about 10 mils in width, i.e., they are about one-hundredth of an inch wide, and may be formed on a sheet of glass or thermoplastic and may be molded or pressed in the glass or pressed into the thermoplastic when it is in a softened state. The general type of stereoscopic picture thus far described is well known and is described, for example, in the aforementioned article by Dudley.

In accordance with one feature of the present invention, the film 15 from which the printing plate is to be formed may be made as a halftone representation of the picture by utilizing a halftone screen 25 placed in front of the lenticular sheet 16 and ruled only in a horizontal direction, i.e. orthogonally with respect to the axes of the lenticules or, less preferably, at some other angle with respect to the axes of the lenticules 17. Such a screen is shown in elevation in FIG. 5. The screen is made up of alternately opaque and transparent strips 26 and 27 extending in a horizontal direction of about equal width and having a center-to-center spacing which may be about the same as the width of the lenticules, i.e. approximately 10 mils. The actual spacing to be used represents a compromise. If the center-to-center spacing is greater, better gray scale is realized but at the expense of vertical resolution. FIG. 6 is a schematic representation of the effect of the halftone screen on the size of the black and white areas of the image of the picture elements for black and for white and for an intermediate shade of gray. This method of making halftone three-dimensional pictures of the interdigitated type and the picture resulting therefrom are more completely described and are claimed in my copending continuation-in-part application Ser. No. 631,770 filed Apr. 18, 1967.

As will be seen from FIG. 6, if the picture elements like the two left-hand elements 18 and 19, for example, are black at that point, the total area is black. The fourth element 21 from the left is white, and it will be seen that then the height of the black area is reduced to zero. The third picture element 20 from the left is gray, and it will be noted that the height of the black area is intermediate the black and the white. The remaining elements 22, 23 and 24 are shown as being the same gray as element 20. The shades of gray in this halftone print are then determined by the height of the black areas. It is apparent that, with wider spacing in the halftone screen, the black areas for black will be of greater height and the gradation from black to white will provide a greater variation and a better gray scale. However, large changes in the ink areas are actually difficult to print with sharpness so that there is a certain loss of resolution in the horizontal direction. This leads to a compromise in which the height of black for black areas, i.e. the center-to-center spacing of the halftone screen, is approximately equal to the width of the picture elements.

In the preceding example, the lines of the halftone screen extend in a direction orthogonal to the picture elements so that the gray scale is determined entirely by the height of the black elements on each picture element, and the resolution is determined by the width of the picture elements in the horizontal direction. It will be appreciated by those skilled in the art that the rulings of the halftone screen may extend at an angle other than orthogonal to the picture elements. For example, an interleaving in a vertical direction of the halftone dots of horizontally adjacent picture elements may be produced if the transparent portions of the halftone screen extend at an angle such that the dark images produced by the halftone screen on adjacent picture elements are interleaved, i.e., they do not lie along a single horizontal line. The significant thing is that the halftone screen is ruled in only one direction and other than the direction of the picture elements, so that the resolution in the other direction is determined by the width of the picture elements and the lenticular plate.

In the preceding description, the preparation of the halftone interdigitated picture on high resolution film has been described as a single exposure process. It will be readily appreciated that the pictures taken at the different vantage points could first be converted to an equal number of halftone pictures which are then utilized to produce the interdigitated halftone composite picture. It is intended that the one and two exposure steps be considered equivalent for purposes of the present invention.

As indicated earlier, if the high resolution film 15 has been prepared in accordance with the explanation of the operation of FIG. 3 and with the further explanation of the halftone screen in connection with FIGS. 5 and 6, the resulting negative may be used to prepare directly a printing plate or printing roll in accordance with processes well known in the printing art. Such a plate or roll may be used to provide, in accordance with an important aspect of the present invention, an improved three dimensional picture including a composite lenticular plate and picture base. As shown in FIG. 7, the material on which the three dimensional picture is to be produced may, to advantage, be in the form of a film or tape of two layers. The upper layer 28, as shown in FIG. 7, may be a conventional photographic film base layer consisting of a triacetate or an acetate. It could, for example, be a tape base sold under the trade name "Cronar" (an optical grade of polyethylene terepthalate). Mylar is also suitable. Such a tape base has a melting temperature in the order of 150° C., and a thickness of 30 to 40 mils, for example, is suitable. The bottom layer, as shown in FIG. 7, is the one which forms the lenticular plate and this, for example, may be a relatively thin layer of thermoplastic material. A layer in the order of 1 to 5 mils, for example, is suitable, with about 3 mils a preferred thickness. This material should have a substantially lower melting point than that of the base and may, for example, be a plasticized medium molecular weight polystyrene. A suitable plasticizer is dioctylphthalate, for example. As will be readily appreciated by those skilled in the art, the melting point may be controlled both by the molecular weight of the polystyrene and by the amount and type of plasticizer used. It will also be apparent that other thermoplastic materials are available which would have a suitable melting point and otherwise be suitable as a permanently deformed tape at room temperature.

In accordance with an important aspect of the present invention, the registry of the three dimensional picture and the lenticule screen is improved. In accordance with the preferred embodiment illustrated, a film or sheet of the medium of the type described in FIG. 7 is passed through a printing press to print the black and white picture information on one surface thereof and form the viewing lenticules on the other surface thereof in a simultaneous operation. As schematically shown in FIG. 8, the medium is passed between the rolls 30 and 31 of a printing press with the picture receiving surface upward and the surface on which the lenticules are to be formed on the bottom side engaging respectively the printing surfaces of the rolls 30 and 31. As illustrated in the drawing, these rolls are directly geared together as shown at 32, 33 so that their positional relationship is insured. The upper printing roll 30 is provided with a surface prepared to print the stereoscopic view including the large number of parallel picture elements taken from the different vantage points, as described in connection with FIGS. 1–5, inclusive.

While the accuracy of registration is insured by forming the image and the lenticular plate in a single operation, registry is improved if the lenticules are formed, and particularly the heating operation is accomplished, after the printing of the picture so that any elongation or other deformation of the medium affects both the image and the lenticules. Registry is also improved if both the printing and lenticule formation are accomplished on a single press even though they are not accomplished, as in the preferred embodiment, in a single operation.

In accordance with an important feature of the present invention, the lower printing roll 31 is prepared to produce or print onto the bottom surface of the medium fine parallel lines having spacings corresponding to the lenticule spacing. A printing roller for printing these lines may be prepared by a photographic process, as will be readily appreciated by those skilled in the printing art. In general, this is accomplished by utilizing a ruled paper to photographically produce on a Kodalith or similar high resolution film a series of fine lines, e.g., having a width in the order of 1 mil and a spacing corresponding to the width of the lens elements of the screen to be produced, e.g. 10 mils wide. The printing roll is then produced from the high resolution film in the usual way. The actual formation of the lenticules on the thermoplastic surface is accomplished in the embodiment shown in FIG. 8 by taking advantage of a phenomenon according to which a pattern of a liquid of one surface tension on the surface of a liquid of substantially lower surface tension will produce thickness deformations of the latter. The deformations correspond in a controlled and predictable way to the pattern of the applied liquid so that desired patterns of deformations may be produced by controlling the pattern of the roller and the surface tension of the liquid applied to the deformable medium. For example, silicone oils such as dimethylsiloxanes having viscosities in the order of 10,000 centistrokes at room temperature, i.e. 25° C., may be printed by the roller 31 in parallel lines on the thermoplastic layer 29, and when the thermoplastic layer is subsequently heated by the heating element shown schematically at 34, the parallel lines having the desired spacing of the lenticules are depressed in the thermoplastic to form the segmental cylindrical lenses. The focal length of the lenses is determined by their curvature, which is in turn determined by the width of the lenticules and the thickness of the thermoplastic layer.

As will be readily appreciated, the lenticules may be formed in the thermoplastic layer in other ways. An electrostatic deformation produced in generally the same manner as that utilized in thermoplastic recording may be employed if desired. This method of recording and apparatus therefor is described in detail and claimed in my U.S. Patent No. 3,113,179, granted Dec. 3, 1963. In FIG. 9, I have shown the construction of a roller having circumferentially spaced conducting fins which may be utilized to produce parallel lines of charge on a thermoplastic surface in the same manner that the parallel lines of silicone oil are applied by the printing roller 31 of FIG. 8. As shown in FIG. 9, the picture is applied by a printing roller 30 which, in this case, is maintained at electrical ground, as shown at 35, and the charge applying roller 36 includes circumferentially spaced radially extending conducting fins 37, which are embedded in an insulating cylinder which may be made up of a plurality of segments 38 and a conducting shaft or core 39. It will be appreciated that the shaft is insulated from the machine base and that, if positional relationship, is maintained between the rollers by gears, these gears will be of insulating material or be mounted to maintain an electrically insulated relationship between rollers 30 and 36. As indicated, the fins are maintained at high direct current voltage with respect to ground, e.g. 500 volts, in order to establish the lines of charge on the thermoplastic material. It will be appreciated that, as layer 29 passes adjacent the heater 24, as in FIG. 8, the deformations form under the electrostatic forces produced by the electrostatic charges. The medium is then cooled by blowing air over it or by simply allowing it to cool in ambient air to return the layer 29 to a solid state. A method and apparatus for forming lenticules in the thermoplastic layer in registry with the groups of picture elements in an interdigitated three-dimensional picture by means of the controlled sweep of an electron beam is described and claimed in my copending continuation-in-part application Ser. No. 631,771 filed Apr. 18, 1967.

In the foregoing I have described my invention as applied to making black and white three dimensional pictures, but since color pictures are often printed by printing the luminance information in a black and white picture and each of the color components by a separate printing step, it is apparent that the present invention is equally applicable to producing three dimensional color pictures. The problem of misregistry of the color printing steps is minimized, in accordance with a feature of my invention, by taking advantage of the fact that the eye is more sensitive to luminance than it is to color. In carrying out the process of printing color pictures, the black and white or luminance information is produced on high resolution film in a manner similar to that described previously but, in addition, the change in luminance at the color boundaries is accentuated or, perhaps more accurately, the luminance information is attenuated except at the color boundaries. This modified luminance information is recorded on a defocused black and white film which is employed as a filter for the production of the black and white film to be used in preparation of the printing roll for the luminance information. This film is produced by exposing it to the projected image from the several projectors through the lenticular plate and a diffusing screen which causes some defocusing of the entire scene. As an alternative, the diffusing screen can be omitted and the lenticular plate omitted so that the film is defocused for all images not in the plane of the paper. By projecting the light from the projectors through this defocused black and white film in the preparation of the high resolution black and white film from which the printing roll is to be made, the lighting at the color edges is accentuated. Viewed in another way, the luminance which is removed from the defocused negatives corresponding to the color components, as will be described, is added to the luminance of the black and white film normally used in color printing. This improved method of producing colored three-dimensional pictures of the interdigitated type in which the luminance of the luminance or black and white picture is accentuated at the luminance edges in an interdigitated picture which includes the three-dimensional information and is correspondingly attenuated at the luminance edges in the color separation pictures is described and claimed in my copending continuation-in-part application Ser. No. 631,803 filed Apr. 18, 1967.

The method of preparing a black and white printing roll as one step of the color printing process to produce an accentuation of the luminance information at the color edges may be better understood by reference to FIG. 10, in which 10(a) illustrates the change of luminance in a color edge. The intensity is that which would normally be used in black and white picture printing. A lower intensity luminance is normally utilized in printing color pictures. FIG. 10(b) illustrates the luminance information at a color edge from a defocused color scene, FIG. 10(c) illustrates the negative of the luminance information in FIG. 10(b), and FIG. 10(d) illustrates the sum of (a) and (c), i.e. the change in luminance at a color edge of an intensity normally used in black and white minus the luminance information from a defocused color negative at a color edge. It may be more accurate to look upon FIG. 10(d) as representing the luminance information of 10(a), i.e. of an intensity normally used for black and white printing, which is reduced in intensity except at the color edge.

Next, defocused color negatives for each of the three colors are produced in a manner similar to that just described but with a color filter in the projection path so that three defocused color negatives are produced. These negatives are in turn utilized for producing the desired printing rollers for the color printing steps.

In carrying out the production of the improved three dimensional picture it is preferable that the luminance information or the black and white picture with the accentuated luminance at the color edges be printed at the same time that the lenticular lens is formed, as described in connection with FIGS. 8 and 9. The color information can then be printed in separate passes through a printing press in fixed spatial relationship with respect to the lenticular plate or, in other words, in registry with the luminance information. Since the eye is less sensitive to the color information, slight errors in registry between the color images and the lenticular plate detract less from the quality of the picture as seen by the viewer than the same lack of registry between the luminance information and the lenticular plate.

What I claim as new and desire to secure by Letters Patent of the United States is:

1. The method of producing a lenticular lens plate as a pattern of deformations on a thermoplastic surface which comprises applying a liquid to the thermoplastic surface in a pattern corresponding to the boundaries of the lenticular lenses, heating the thermoplastic until it is melted, the applied liquid having a higher surface tension than the melted thermoplastic so that the forces resulting from the different surface tensions produce the desired pattern of lenticular lenses and solidifying the thermoplastic material by cooling to preserve the pattern of lenticular lenses.

2. The method of producing a predetermined pattern of deformations on a thermoplastic surface which comprises applying a liquid to the thermoplastic surface in a pattern corresponding to the desired pattern of deformations, heating the thermoplastic until it is melted, the applied liquid having a different surface tension than the melted thermoplastic so that the forces resulting therefrom produce the desired pattern of deformation and solidifying the thermoplastic material by cooling to preserve the pattern of lenticular lenses.

3. The method of producing a three-dimensional picture of the type to be viewed through a sheet of lenticular lenses which comprises providing a composite transparent sheet having an ink receiving surface and an opposed thermoplastic surface which is solid at room temperature, applying ink to said ink receiving surface to produce the picture and applying the lenticular lens pattern to the thermoplastic surface in positionally synchronized relation to the picture by printing a liquid on the thermoplastic surface having a higher surface tension than the surface tension of the thermoplastic layer when melted, heating the thermoplastic layer to melt it and permit the deformation thereof by forces resulting from the differences in the surface tension of the liquid and melted thermoplastic and solidifying the thermoplastic layer by cooling to preserve the lenticular lens pattern.

4. The method of forming a three-dimensional picture of the type to be viewed through a sheet of lenticular lenses and including a plurality of interdigitated picture elements arranged in groups, with each group to be viewed through a lenticular lens element which comprises providing a thermoplastic layer over the picture receiving surface which carries the groups of interdigitated picture elements and applying to the thermoplastic layer in registry with the edges of the groups of picture elements an electrostatic charge sufficient to produce deformations in the thermoplastic when heated to form lenses in registry with the edges of the groups of picture elements and modifying the temperature of the thermoplastic to soften the thermoplastic and produce a deformation pattern corresponding to the applied electrostatic charge and solidifying the thermoplastic layer by cooling to preserve the deformation pattern.

References Cited

UNITED STATES PATENTS

| 2,562,077 | 7/1951 | Winnek. | |
| 2,914,407 | 11/1959 | Meyer | 96—45 |
| 3,241,429 | 3/1966 | Rice et al. | 117—10 |
| 3,110,608 | 11/1963 | Brunson et al. | 350—131 |
| 3,332,775 | 7/1967 | Mandler | 96—40 |
| 3,264,164 | 8/1966 | Jerothe et al. | 161—34 |

DAVID KLEIN, Primary Examiner

U.S. Cl. X.R.

96—40; 156—58; 350—131